United States Patent
Rast et al.

[11] 3,891,559
[45] June 24, 1975

[54] DYE LASER TRANSMITTER-RESONANT FLUORESCENT DETECTOR SYSTEM FOR OPTICAL COMMUNICATIONS

[75] Inventors: Howard E. Rast, Solana Beach; Hubert H. Caspers, San Diego, both of Calif.

[73] Assignee: The United States of America as represented by the Secretary of the Navy, Washington, D.C.

[22] Filed: Aug. 2, 1974

[21] Appl. No.: 494,102

[52] U.S. Cl. ............................. 250/199; 350/311
[51] Int. Cl.² ............................................ H04B 9/00
[58] Field of Search ............ 250/199; 350/317, 312; 356/85, 87

[56] References Cited
UNITED STATES PATENTS
3,190,172   6/1965   Langberg ........................... 356/85
3,489,942   1/1970   Walsh et al ......................... 356/85

*Primary Examiner*—George H. Libman
*Attorney, Agent, or Firm*—R. S. Sciascia; G. J. Rubens; T. M. Phillips

[57] ABSTRACT

Dye laser transmitter-resonance fluorescent detector system for underwater optical communications. An optical carrier in the region of 4,900A is generated. The detector comprises an evacuated enclosure having an inner chamber and an outer chamber with means for evaporating a resonance detector material such as sodium. Upon vaporization a stream of molecules diffuse from the inner chamber into the outer chamber. The detector is arranged so that the signal is incident at right angles to the stream of molecules and a photo detector or observer is mutually perpendicular to both signal and beam.

3 Claims, 5 Drawing Figures

DYE LASER TRANSMITTER-RESONANT FLUORESCENT DETECTOR SYSTEM FOR OPTICAL COMMUNICATIONS

BACKGROUND OF THE INVENTION

Because of their high frequency, electromagnetic waves in the visible region of the spectrum offer an attractive approach to communications technology. Such waves are theoretically capable of conveying much more information than electromagnetic waves in the microwave or radio frequency region of the spectrum. Until the development and refinement of the laser, however, no practical method existed which was capable of producing coherent optical carrier frequencies of sufficient intensity to operate over greater distances than a few meters. Rapid refinement of lasers and the invention of tunable dye lasers within the last few years, has provided the prospect of a feasible transmitter capable of generating coherent optical carrier frequencies. and, thereby, a realization of practical transmitter-receiver configurations.

However, it is desirable that any such system must operate under ambient conditions similar to microwave or high frequency radio communications systems. The radio communications technology was successful due to the ease of producing coherent oscillations and radiation and reception of modulated signals in an environment in which background noise was minimal.

On the other hand, optical transmissions in the visible spectrum must compete with a variety of noise sources such as solar radiation and artificial lighting. A practical communication system for this region of the spectrum must incorporate a high degree of selectivity and noise rejection to be useful for long range communications. In addition, if such systems are to function in an environment where the signal must traverse a path under water, it must be capable of discriminating against scattered and direct solar radiation incident upon the receiver from all directions.

SUMMARY OF THE INVENTION

The present invention provides a practical system for the transmission and reception of optical signals between transmitters and receivers above or underwater in the visible region of the electromagnetic spectrum. A narrow band optical receiver including an evacuated enclosure having an inner chamber and an outer chamber with a communicating slot. Means are provided in the inner chamber for evaporating a resonance detector material, such as sodium, to provide a stream of sodium atoms to the outer chamber in the enclosure. The evacuated enclosure is positioned with respect to the transmitted optical signals so that the received signals arrive at right angles to the stream of sodium atoms. A photo detector or observer is located mutually perpendicular to both the incoming signal and the stream of molecules for detecting the transmitted signal.

Accordingly, an object of the invention is the provision of a system for the transmission and reception of optical signals wherein extreme selectivity of signal frequency through extremely narrow band filtering with consequent noise reduction is attained.

Another object of the invention is the provision for the transmission and reception of optical signals by laser means wherein provisions are provided for the tuning of the filter detector.

A further object of the invention is the provision of a laser system for the transmission and reception of optical systems wherein the detector is provided with a large optical aperture as compared with prior known detectors.

Still another object of the invention is the provision of a system for the transmission and reception of optical signals using lasers wherein signal power is not significantly attenuated by the detector filter.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
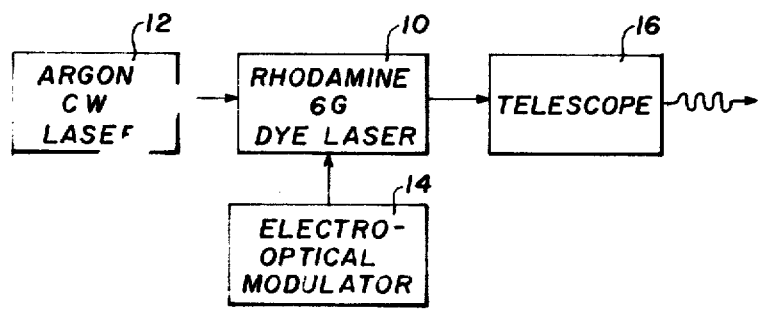
FIG. 1 is a block diagram of a laser transmitter.

The optical communications system embodying the present invention consists of a transmitter, modulator, a selective tunable filter, and a detector. The transmitter should provide a source of modulated carrier waves capable of transmission through an optical window of water. Referring now to FIG. 1 the transmitter consists of a dye laser 10 pumped by an argon CW laser 12. The active medium of the dye laser 10 is rhodamine 6G which permits a tunable range from 5,640 to 6,400A, and a bandwidth of 1A or less. Laser 10 is modulated by an electro-optical modulator 14 in the conventional manner to provide a modulated signal which is fed to a telescope in the conventional manner and transmitted through a medium as for example, coastal ocean water, to a detector.

Figure 2:
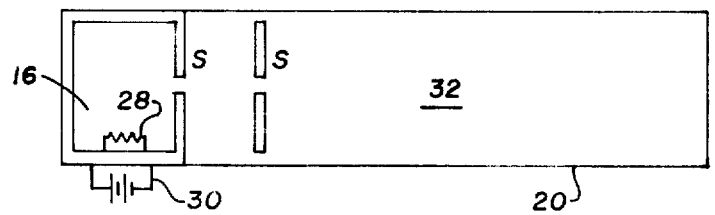
FIG. 2 is a diagram of the receiver detector.
Figure 3:
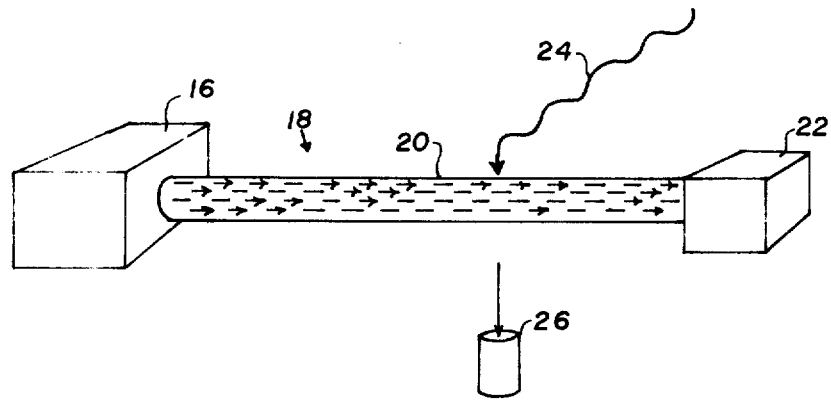
FIG. 3 is a cross-section showing the oven and outer chamber of the detector-receiver of FIG. 2.

Referring now to FIG. 3 there is shown the detector apparatus comprised of an oven 16 for generating a molecular beam 18 terminating in an absorbing means 20 which may be a container coated with lamp black. Oven 16, elongated portion 20, and absorbing means 22 form a closed system which is evacuated to a low pressure. The incoming signal plus noise 24 intercepts the molecular beam 18 at right angles. Photo tube detector 26 is perpendicular to both the molecular beam 18 and the incoming signal 24. As shown in FIG. 2 oven 16 contains the material, such as sodium, to be used as the resonance detector. Upon heating by means of heater element 28 and power source 30, the metal vaporizes and a stream of molecules diffuses through the slit S into the outer chamber 32. The total number of molecules emerging may be represented by $Q = \frac{1}{4} n v A_s$ wherein n is a number of molecules per unit volume in the oven 16, v is their average velocity, and $A_s$ is the area of slit S. The second slit S' will reduce the value of Q emerging into chamber 32, but serves to collimate the beam of molecules. The Standard Beam Intensity (SBI) is a figure used by workers in atomic beam experiments to represent intensity of such fusive molecules at a distance of one meter from the source. This intensity is possibly $5 \times 10^{16}$ particles/seconds per sterradian for a slit 1 millimeter high. This figure is approximately the same for all neutral molecules under ordinary thermal effusion.

As shown in FIG. 2 oven 16 and enclosure 20 are so arranged that the incoming signal 24 is incident at right angles to the stream of molecules and photo detector 26 is mutually perpendicular to both signal and beam. The incoming signal 24 is then interacting with a beam of gas molecules whose absorption lines show no Doppler broadening. The result is the system provides a very narrow band pass to the incoming signal.

Figure 4:
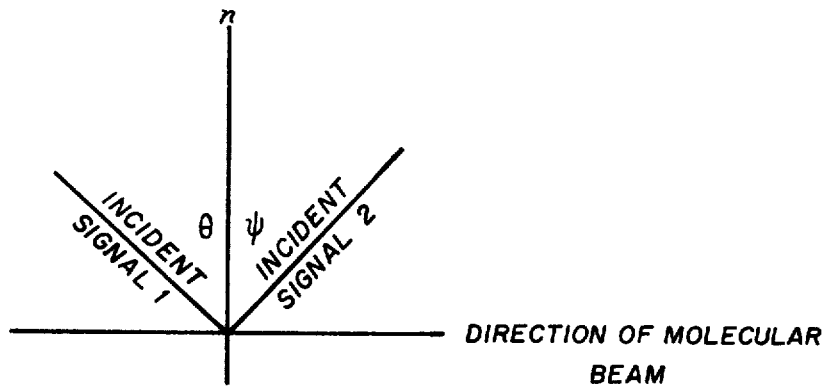

As pointed out above, when the exciting beam 24 is incident upon the molecular beam 18 at right angles the apparent bandwidth of the resonant absorption line is the natural breadth. If the angle of incidence is varied from 90° however, the line will begin to broaden since the incident signal "sees" the Doppler shifts in frequency. In the diagram of FIG. 4 two signal beams are incident upon the molecular beam at angles $\theta$ and $\Psi$ to the normal, $n$, to the beam. A photon in signal beam 1 will therefore interact with an atomic line whose line width is broadened toward the lower frequency region by an amount $\nu_o (1 - v/c \sin \theta)$. However, since the beam has a maxwellian distribution of velocities, the line width envelope is represented by $\exp[-Mv^2\sin^2\theta/2kT] = \exp[-(\Delta\omega/\Delta\omega_D)^2]$ where $\Delta\omega = \pm \omega_o v/c \sin \theta$ and $\Delta\omega_D$ is the Doppler breadth.

Figure 5:
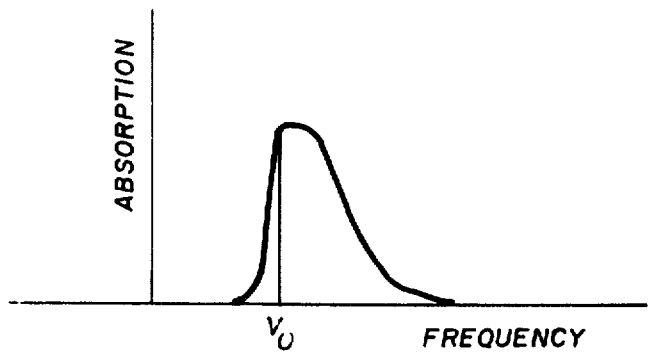

As shown in FIG. 5 the envelope for signal 2 is schematically represented where the absorption line width is broadened to higher frequencies as $\nu = \nu_o(1 + v/c \sin \Psi)$. The half-breadth of the absorption line on the low frequency line of $\nu_o$ is the natural or "damping" breadth of the line, whereas the high frequency side is determined by the Doppler breadth. By changing the angle of incidence, a sharp-cut or high pass filter is created whose cut-off frequency is determined by the natural breadth of the absorption line and the dynamic frequency range on the high side is controlled by the angle of incidence and is limited only by the full Doppler breadth when $\Psi = \pi/2$. The same holds for the low frequency Doppler shift where one has, in effect, a low pass filter.

In practicing the invention the following values are based on using the 5,896A resonant line and sodium. The vapor pressure of elemental sodium is represented as a function of temperature by $\log_{10} p = 7.553 - 5395/T_k$ where $p$ is in torrs and $T_k$ in degrees Kelvin.

| T°C | p (torrs) |
|---|---|
| 100 | $1.23 \times 10^{-8}$ |
| 150 | $6.29 \times 10^{-6}$ |
| 200 | $1.40 \times 10^{-4}$ |
| 250 | $1.73 \times 10^{-3}$ |
| 300 | $1.37 \times 10^{-2}$ |
| 350 | $7.82 \times 10^{-2}$ |
| 400 | $3.44 \times 10^{-1}$ |

In practice it has been determined that the evacuated enclosure of oven 16, enclosure 20, and absorbing box 22 should not be less than $10^{-7}$ torrs. The system will optimize at temperatures between 100° and 400°C. For example at T = 157°C, $P_{cap} = 10^{-5}$ torrs. By way of example, a working temperature of 200°C based on the sodium D line at 5,896A.

Obviously many modifications and variations of the present invention are possible in the light of the above teachings. It is therefore to be understood that within the scope of the appended claims the invention may be practiced otherwise than as specifically described.

What is claimed is:

1. In an optical communication system the combination comprising:
   a. an optical transmitter for transmitting an electro-optically modulated CW laser beam at a predetermined frequency;
   b. filter means for intercepting the optically transmitted signal, said filter means including a molecular beam intersecting said incoming signal for absorbing and re-emitting energy at the frequency of said transmitted beam, said filter means being variable from a high pass filter to a low pass filter by changing the angle of incidence between said molecular beam and said intercepted signal;
   c. detecting means positioned to intercept said re-emitted energy for detecting said incoming signal.

2. The optical communication system of claim 1 wherein said molecular beam is generated by an enclosure containing an oven for evaporating a metal having the appropriate characteristics for selectively absorbing and re-emitting at said predetermined frequency.

3. The system of claim 1 wherein said molecular beam is positioned at right angles to said intercepted signal to provide maximum filtering of noise.

* * * * *